United States Patent
Stodola et al.

(10) Patent No.: US 7,114,736 B2
(45) Date of Patent: Oct. 3, 2006

(54) VEHICLE MOUNTED STEP ASSEMBLY

(75) Inventors: Craig S. Stodola, Savage, MN (US); Justin E. Schultz, Savage, MN (US)

(73) Assignee: Arctic Fox, Inc., Delano, MN (US)

( * ) Notice: Subject to any disclaimer, the term of this patent is extended or adjusted under 35 U.S.C. 154(b) by 302 days.

(21) Appl. No.: 10/776,039

(22) Filed: Feb. 11, 2004

(65) Prior Publication Data

US 2004/0160035 A1    Aug. 19, 2004

Related U.S. Application Data

(60) Provisional application No. 60/447,653, filed on Feb. 14, 2003.

(51) Int. Cl.
*B60R 3/02*   (2006.01)

(52) U.S. Cl. .................. 280/164.1; 280/166; 224/519; 224/486

(58) Field of Classification Search ................ 280/769, 280/163, 164.1, 166; 224/486, 484, 519
See application file for complete search history.

(56) References Cited

U.S. PATENT DOCUMENTS

| | | | |
|---|---|---|---|
| 3,580,613 A | 5/1971 | Northrup | |
| 3,606,382 A | 9/1971 | Pollock | |
| 3,853,369 A | 12/1974 | Holden | |
| 3,865,399 A | 2/1975 | Way | |
| 3,889,997 A | 6/1975 | Schoneck | |
| 3,927,903 A | 12/1975 | Jones | |
| 4,089,276 A | 5/1978 | Enos | |
| 4,194,754 A | 3/1980 | Hightower | |
| 4,234,284 A | 11/1980 | Hauff | |
| 4,639,032 A | 1/1987 | Barbour | |
| 4,676,414 A | 6/1987 | Deguevara | |
| 4,695,218 A | 9/1987 | Boyer | |
| 4,744,590 A * | 5/1988 | Chesney | ...................... 280/769 |
| 4,757,876 A | 7/1988 | Peacock | |
| 4,813,842 A | 3/1989 | Morton | |
| 4,846,487 A | 7/1989 | Criley | |
| 4,915,276 A | 4/1990 | Devito | |
| 5,106,002 A | 4/1992 | Smith et al. | |
| 5,181,822 A | 1/1993 | Allsop et al. | |
| 5,215,234 A | 6/1993 | Pasley | |
| 5,310,100 A | 5/1994 | Liscinsky | |
| 5,372,287 A | 12/1994 | Deguevara | |
| 5,397,147 A | 3/1995 | Ducharme et al. | |
| 5,439,151 A * | 8/1995 | Clayton | ...................... 224/509 |
| 5,549,312 A | 8/1996 | Garvert | |
| 5,570,826 A | 11/1996 | Garbes et al. | |
| 5,586,702 A | 12/1996 | Sadler | |
| 5,680,976 A | 10/1997 | Koliopoulos et al. | |

(Continued)

OTHER PUBLICATIONS

Twistep Assembly, Installation, Use and Safety Instructions, pp. 1-4.

(Continued)

*Primary Examiner*—Jeff Restifo
(74) *Attorney, Agent, or Firm*—Patterson, Thuente, Skaar & Christensen, P.A.

(57) ABSTRACT

A vehicle mounted step assembly for use with trailer hitch. The vehicle mounted step assembly includes a platform portion and a tongue portion. The platform portion is pivotable with respect to the tongue portion between a lowered use position and a raised storage position. The platform portion is also slidable with respect to the tongue portion from a first configuration to a second configuration.

22 Claims, 6 Drawing Sheets

U.S. PATENT DOCUMENTS

| | | | | |
|---|---|---|---|---|
| 5,685,686 | A | 11/1997 | Burns | |
| 5,697,623 | A * | 12/1997 | Bermes et al. | 280/32.7 |
| 5,732,996 | A | 3/1998 | Graffy et al. | |
| 5,738,362 | A | 4/1998 | Ludwick | |
| 5,752,639 | A | 5/1998 | Rice | |
| 5,775,560 | A | 7/1998 | Zahn et al. | |
| 5,803,475 | A | 9/1998 | Dick | |
| 5,803,523 | A | 9/1998 | Clark et al. | |
| 5,820,004 | A | 10/1998 | Lane | |
| 5,820,193 | A | 10/1998 | Straffon | |
| 5,842,709 | A | 12/1998 | Maccabee | |
| 5,881,937 | A | 3/1999 | Sadler | |
| 5,931,362 | A | 8/1999 | Chimenti | |
| 6,095,387 | A | 8/2000 | Lipscomb | |
| 6,099,035 | A * | 8/2000 | Garvin, III | 280/769 |
| 6,116,378 | A | 9/2000 | Barrow | |
| 6,145,865 | A | 11/2000 | Cannara et al. | |
| 6,152,341 | A | 11/2000 | LeMay et al. | |
| 6,158,798 | A | 12/2000 | Stedtfeld et al. | |
| 6,170,843 | B1 | 1/2001 | Maxwell et al. | |
| 6,179,184 | B1 | 1/2001 | Belinky et al. | |
| 6,202,909 | B1 | 3/2001 | Belinky et al. | |
| 6,237,927 | B1 | 5/2001 | Debo | |
| 6,253,981 | B1 | 7/2001 | McLemore | |
| 6,270,139 | B1 | 8/2001 | Simpson | |
| 6,296,290 | B1 | 10/2001 | Wolf | |
| 6,336,413 | B1 | 1/2002 | Ball | |
| 6,378,748 | B1 | 4/2002 | Cox | |
| 6,422,342 | B1 | 7/2002 | Armstrong et al. | |
| 6,474,668 | B1 | 11/2002 | Debo | |
| 6,499,564 | B1 | 12/2002 | Puglisi | |
| 6,511,086 | B1 | 1/2003 | Schlict | |
| 6,530,588 | B1 | 3/2003 | Varney et al. | |
| 6,554,311 | B1 | 4/2003 | Blankenship et al. | |
| 6,659,484 | B1 * | 12/2003 | Knodle et al. | 280/166 |
| 6,682,086 | B1 * | 1/2004 | Erickson | 280/166 |
| 6,685,204 | B1 * | 2/2004 | Hehr | 280/166 |
| 6,769,704 | B1 * | 8/2004 | Cipolla | 280/163 |
| 6,846,017 | B1 * | 1/2005 | Martin | 280/769 |
| 6,935,647 | B1 * | 8/2005 | Knodle et al. | 280/166 |
| 2001/0035625 | A1 | 11/2001 | Debo | |
| 2001/0045720 | A1 | 11/2001 | Schlict | |
| 2002/0060440 | A1 | 5/2002 | Storer | |
| 2002/0073935 | A1 | 6/2002 | Graham et al. | |
| 2002/0121760 | A1 | 9/2002 | Puglisi | |
| 2002/0197142 | A1 | 12/2002 | Anderson et al. | |
| 2005/0023315 | A1 * | 2/2005 | Skinner | 224/506 |
| 2005/0275187 | A1 * | 12/2005 | Chaudoin et al. | 280/166 |

OTHER PUBLICATIONS

Hitch Step/Towheads, Hitch Step, p. 15.
Carr Pattern Company, Inc., p. 24.
Car Barriers, www.dresslersdog.com/carbarrier.html, pp. 1-6.
Twistep by OT, Dial up the Utility on your SUV! With Twistep the instant, multi-use step, http://www.twistep.com/index.htm, p. 1.
Pet Information, http://www.twistep.com/petinfo.htm, pp. 2-4.
Twistep by OT, Dimensions & Specification, http://www.twistep.com/dimensionsandspecificaitons.htm, pp. 1-2.
Overton's 2003 Spring Master, p. 115.
Steel Horse Receiver Hitch Step, http://www.autobarn.net/steelhourrech.html, p. 1.
Go Rhino Universal HitchStep, http://shop.store.yahoo.com/rodi/gorhinunhit.html, p. 1 of 2.
Step-Around Step, Custom Fit Vehicle-Make/Year/Mode, p. 1.
Bumper Hitch Step, Bumpter/Hitch Step Bars, http://www.sportsimportsltd.com/bumhitstep.html, p. 1.
http://store1.yimg.com/I/truckstuffusa_1733_294812, p. 1.
Cabela's Automotive & ATV 2003 catalog, pp. 56, 67, 71 and last page.
Cabela's—Petstop II Pet Ramp, http://www.cabelas.com/cabelas/en/templates/product/standard-item.jhtml?id+001999186174, p. 1.
Bass Pro Shops Marine Catalog 2003, pp. 140-141.
Twistep Multi-Use SUV Stair Step, http://canineauto.com/twistep.htm, pp. 1-5.
"TWISTEP The Instant Multi-Use Step for Your Truck or SUV", Product Brochures, www.twistep.com (8 pgs.).
"StepLite by DAC Sky—Innovative truck products for professionals and outdoorsmen," Sportsman Gear Magazine, vol. 23, issue 4, p. 21.

* cited by examiner

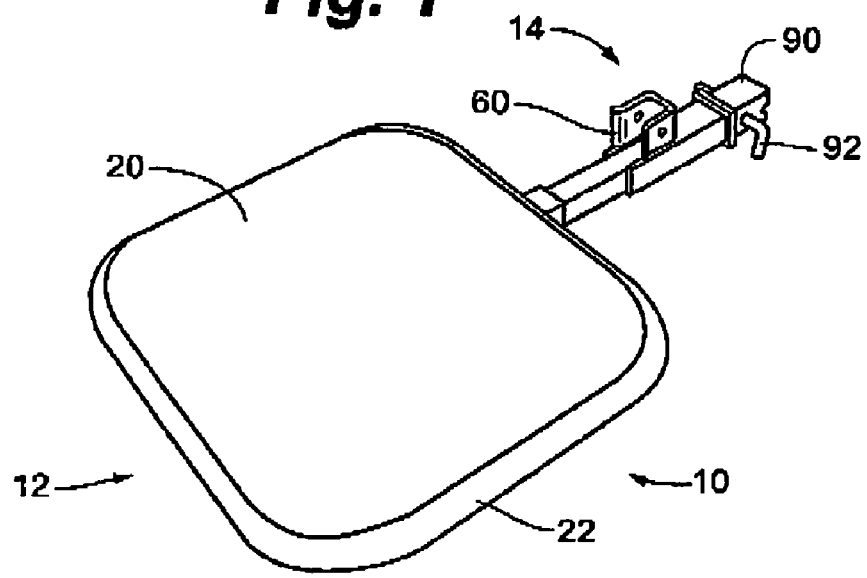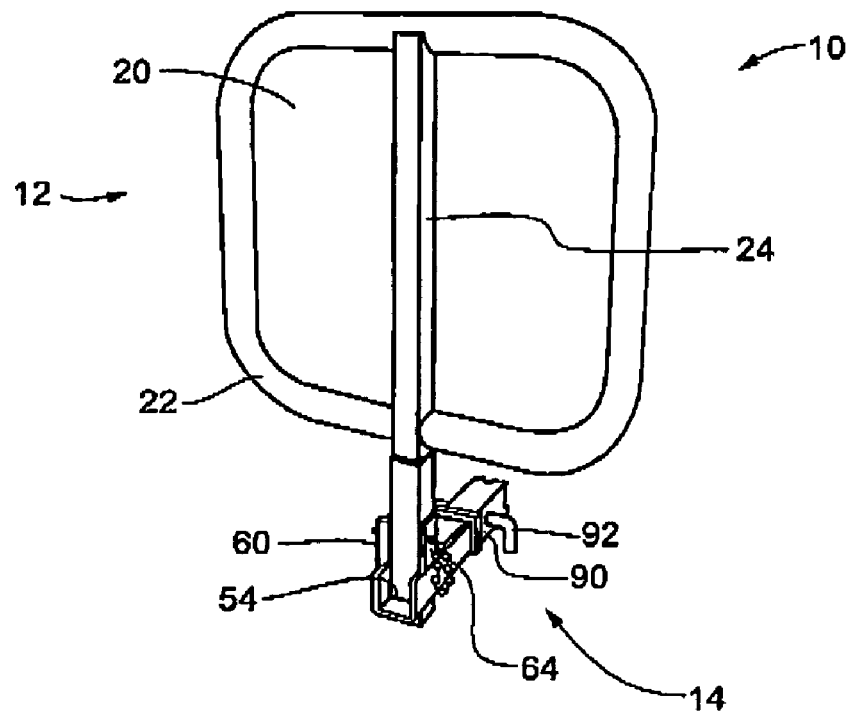

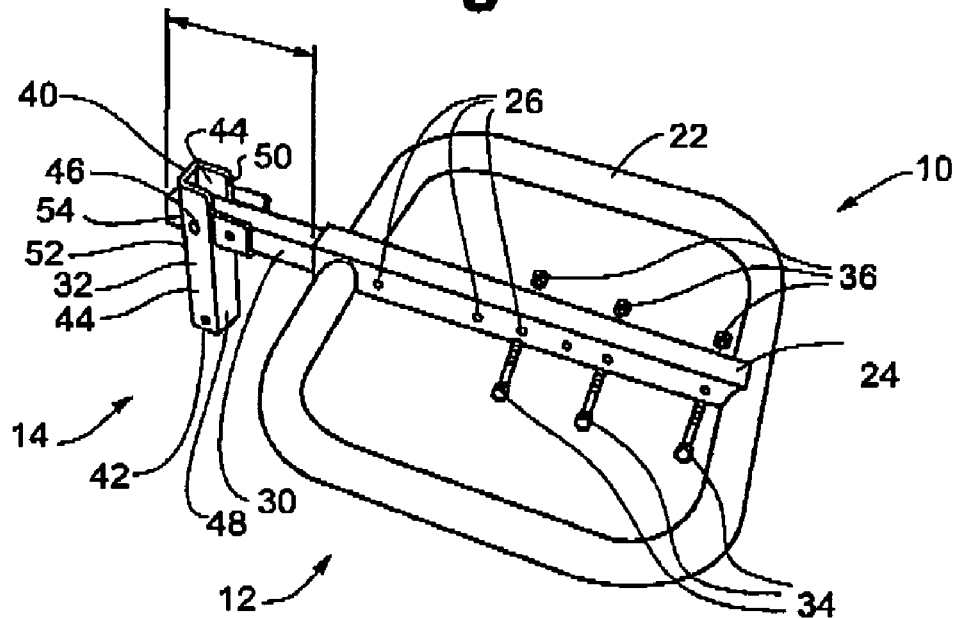
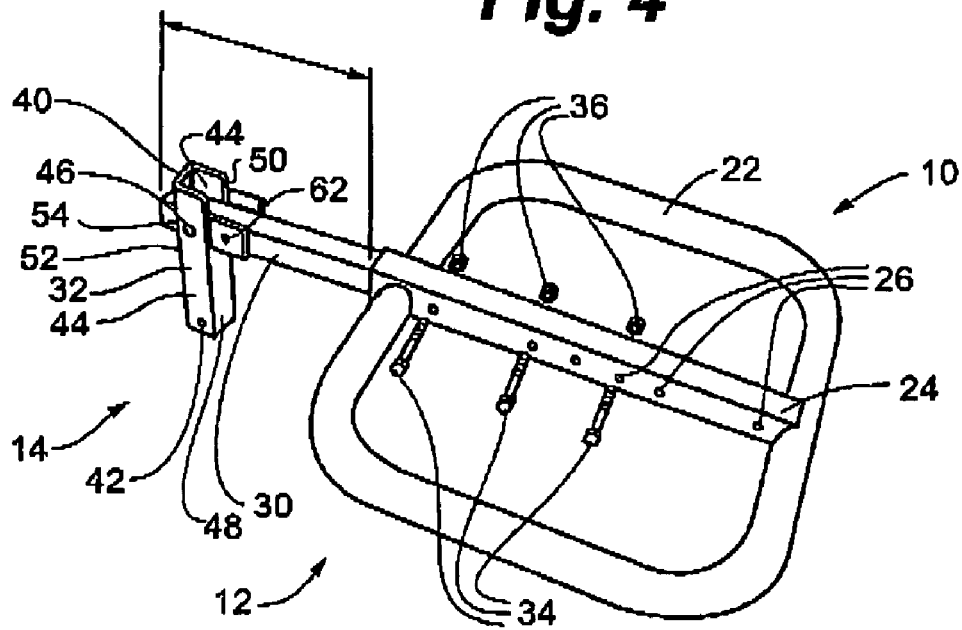

VEHICLE MOUNTED STEP ASSEMBLY

REFERENCE TO RELATED APPLICATION

The present application claims priority to U.S. Provisional Application No. 60/447,653, filed Feb. 14, 2003. The identified provisional application is hereby incorporated by reference in its entirety.

FIELD OF THE INVENTION

The present invention relates generally to a vehicle mounted step assembly. In particular, it relates to a tow hitch mounted vehicle step assembly.

BACKGROUND OF THE INVENTION

Most pickup trucks and sport utility vehicles include a tailgate or end gate that, when opened, may be as high as approximately 30 inches above the ground upon which the vehicle is parked. Other vehicles have a raised chassis that makes this height even greater. This is height difficult to climb when getting in and out of the vehicle bed, and most often requires an agile human to accomplish this without undue difficulty.

Climbing this height is an even more difficult task for a dog. Often the tailgate is at eye level or above for a dog, so it requires a rather large jump from the dog to get himself into the back of a vehicle. In addition, when the dog jumps down from the tailgate, it is a hard landing on the ground.

Getting into and out of a vehicle bed is even more difficult as the dog gets older. Many older dogs suffer from arthritic joints and varying levels of blindness that can make getting into and out of a truck bed a dangerous and painful task. In addition, if a dog is too small, the height of the tailgate may be too high for him to jump, thus making it the owner's job to lift the dog in and out each time.

Hitch mounted or tailgate mounted step assemblies are well known in the art. Some models such as Graffy et al., U.S. Pat. No. 5,732,996, and Armstrong et al., U.S. Pat. No. 6,422,342, consist of a swinging step hanging down from the tailgate, much like a boat ladder. These types of steps would not work well for a dog, because the steps hang down directly below the lip of the tailgate and once a dog got his front legs onto this step, he would have a hard time getting his back legs onto the step to push his way up. For a step to be useful for a dog, it really needs to be of a sufficient size that the dog could sit on it. That is not the case for either of these inventions.

Another step assembly is disclosed in Peacock, U.S. Pat. No. 4,757,876. This device is essentially a stepladder that attaches directly to the tailgate and folds down to the ground. This type of step would also not work well for a dog because it is too nearly vertical and the steps are too small to accommodate a large dog's feet. Again, a dog needs a rather large step that he can get all four feet onto in order to jump onto a tailgate.

Cannara et al., U.S. Pat. No. 6,145,865, and Ludwick, U.S. Pat. No. 5,738,362, each disclose a rotating step for a trailer hitch. The step rotates from a stepping position that is behind the trailer hitch to a storage position that is substantially under the trailer hitch. Positioning the step under the trailer hitch when not in use reduces the vehicle's ground clearance and enhances the potential of damage to the rotating step caused by the rotating step contacting the ground as the vehicle is moved.

Debo, U.S. Pat. Nos. 6,237,927 and 6,474,668, each disclose a step that is particularly suited for use with a pick-up. The step is mounted to the vehicle frame and includes a shaft that permits the step to slide from a position close to the vehicle for use with the tailgate up to a position farther away from the vehicle for use with the tailgate down.

Schlicht, U.S. Pat. No. 6,511,086, describes a foldable step for a trailer hitch. The foldable step is movable between a lowered position and a raised position. The step is maintained in the raised position by a clip.

There are also several patents that disclose hitch mounted cargo carriers. Sadler, U.S. Pat. No. 5,881,937, describes a support frame that attaches to a trailer hitch. The support frame includes a telescoping shaft that enables the support frame to be moved away from the back of the vehicle to permit opening of a rear access hatch on the vehicle.

Belinky et al., U.S. Pat. Nos. 6,179,184 and 6,202,909, each disclose a trailer hitch mounted cargo carrier having a platform that is removably attached to a drawbar.

Lipscomb, U.S. Pat. No. 6,095,387, discusses a collapsible multi-purpose carrier that attaches to a trailer hitch. Collapsing the multi-purpose carrier significantly reduces the area needed to store the multi-purpose carrier.

As a result of the failings of the conventional art, there is a need for a step assembly that substantially solves the problems related to dog use innately present with conventional step assemblies. There is a need to provide for a vehicle step assembly that functions to provide a stable, sturdy, suitably sized step that is designed with the needs of dogs in mind.

SUMMARY OF THE INVENTION

The present invention is directed to a vehicle mounted step assembly for use with trailer hitch. The vehicle mounted step assembly includes a platform, a main shaft, a pivot mount and a pivot arm locking bracket.

The platform has a top plate and central member attached thereto. The main shaft is slidable with respect to the central member between a first configuration and a second configuration.

The pivot mount has a first end and a second end. The first end is adapted for attachment to a trailer hitch having a square hitch receiver. The second end is pivotally mounted to an end of the main shaft that is opposite the central member. The main shaft is pivotable with respect to the pivot mount between a lowered position and a raised position.

The pivot arm locking bracket is attached to the pivot mount proximate the second end. The pivot arm at least partially extends around the main shaft when the main shaft is in the raised position.

BRIEF DESCRIPTION OF THE DRAWINGS

FIG. 1 is a perspective view of a vehicle mounted step assembly according to an embodiment of the present invention in a lowered position.

FIG. 2 is a perspective view of the vehicle mounted step assembly in a raised position.

FIG. 3 is a perspective view of the vehicle mounted step assembly in a first configuration.

FIG. 4 is a perspective view of the vehicle mounted step assembly in a second configuration.

DETAILED DESCRIPTION OF THE PREFERRED EMBODIMENTS

Figure 5:
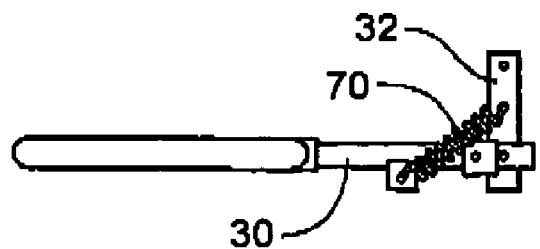
FIG. 5 is a side view of an alternative embodiment of the vehicle mounted step assembly.

The present invention is a vehicle mounted step assembly as illustrated at 10 in the Figures. The vehicle mounted step assembly 10 is particularly suited for use with a standard receiver hitch that is found on many vehicles. The vehicle mounted step assembly 10 generally includes a platform portion 12 that is pivotally mounted with respect to a tongue portion 14.

The vehicle mounted step assembly 10 is pivotable between a lowered use position (FIG. 1) and a raised storage position (FIG. 2). The vehicle mounted step assembly 10 is also movable between a first configuration (FIG. 3) that is particularly suited for use with sport utility or similar vehicles to a second configuration (FIG. 4) that is particularly suited for use with pick-ups.

Forming the vehicle mounted step assembly 10 as described herein preferably provides the vehicle mounted step assembly 10 with a capacity of at least 500 pounds. The structure of the vehicle mounted step assembly 10 thereby enables the vehicle mounted step assembly 10 to not only be used by pets but also by persons who are carrying heavy objects into and out of the vehicle bed. The vehicle mounted step assembly 10 thereby enhances the ability for persons and dogs to get into and out of the vehicle bed.

The platform portion 12 generally includes a top plate 20 that is attached to a frame 22. The top plate 20 preferably has a rectangular shape with a length and a width of between about 18 inches and 24 inches to provide a surface area of at least 300 square inches. The top plate 20 is preferably fabricated from a metallic material that is coated to enhance traction. One preferred coating material is a textured powder coating.

The frame 22 preferably extends around an outer edge of the top plate 20. The wall profile, wall thickness and tubing diameter of the frame 22 are selected based upon the intended capacity of the vehicle mounted step assembly 10. For most applications, the frame 22 preferably has a circular profile and a diameter of between 1 inch and 2 inches.

The frame 22 also preferably includes a central member 24 that extends across the top plate 20, as most clearly illustrated in FIGS. 3–4. The central member 24 preferably has a substantially square profile and includes a plurality of holes 26 that extend through each side thereof. The holes 26 are preferably arranged in a first set of holes and a second set of holes.

The tongue portion 14 generally includes a main shaft 30 and a pivot mount 32. The main shaft 30 is selected with a profile that is approximately the same as the central member 24 and an outer height and width that are slightly smaller than an inner height and width of the central member 24. This configuration permits the main shaft 30 to slide at least partially inside of the central member 24.

The main shaft 30 includes holes (not shown) that are arranged to either be aligned with the first set of holes in the central member 24 or the second set of holes in the central member 24 for moving the vehicle mounted step assembly 10 between the first configuration and the second configuration.

An end of the main shaft 30 that is opposite the platform portion 12 has a hole (not shown) formed therein for attaching the main shaft 30 to the pivot mount 32, as is described in more detail below.

The main shaft 30 is maintained in either the first configuration or the second configuration by extending screws 34 through the holes in the central member 24 and the main shaft 30 and then attaching nuts 36 to the screws 34.

Similar to the central member 24, the pivot mount 32 has a profile that is similar to the main shaft 30 and a height and width that are slightly larger than the height and width of the main shaft 30.

The pivot mount 32 has a first end 40 and a second end 42. Side walls 44 of the pivot mount 32 each have a pivot aperture 46 formed therein. An upper wall 48 of the pivot mount 32 has an upper opening 50 formed therein that extends from the first end 40 to proximate the pivot aperture 46. A lower wall 52 of the pivot mount 32 has a lower opening 54 formed therein proximate the pivot aperture 46.

A pivot arm mounting bracket 60 is attached to the upper wall 48 proximate the pivot aperture 46. The pivot arm mounting bracket 60 preferably extends around three sides of the main shaft 30 when the vehicle mounted step assembly 10 is in the raised position.

The pivot arm mounting bracket 60 preferably has a pair of apertures 62 formed therein. The apertures 62 are aligned with apertures (not shown) on the main shaft 30 when the vehicle mounted step assembly 10 is in the raised position so that a clip 64 may be extended therethrough to maintain the vehicle mounted step assembly 10 in the raised position.

As an alternative to using the clip 64, sides of the pivot arm mounting bracket 60 may frictionally engage sides of the main shaft 30 to maintain the vehicle mounted step assembly 10 in the raised position. In this configuration, the pivot arm mounting bracket 60 is fabricated from a slightly resilient material.

A person of ordinary skill in the art will appreciate that it is also possible to use a handle that is biased towards the pivot mount 32 such that the handle engages a slot or opening on the pivot mount 32 to maintain the platform portion 12 in the raised position. Urging the handle away from the pivot mount 32 enables the platform portion 12 to pivot from the raised position to the lowered position.

In yet another configuration, the vehicle mounted step assembly 10 is maintained in the raised position by a spring 70 that extends between the main shaft 30 and the pivot mount 32, as illustrated in FIG. 5. The size and length of the spring 70 is selected based upon the weight of the platform portion 12 to maintain the vehicle mounted step assembly 10 in the raised position until a force is applied to urge the vehicle mounted step assembly 10 to the lowered position.

The spring 70 is preferably oriented in an over center configuration so that the spring 70 does not automatically cause the vehicle mounted step assembly 10 to move from the lowered position to the raised position without a force being applied to the vehicle mounted step assembly 10.

Figure 6:
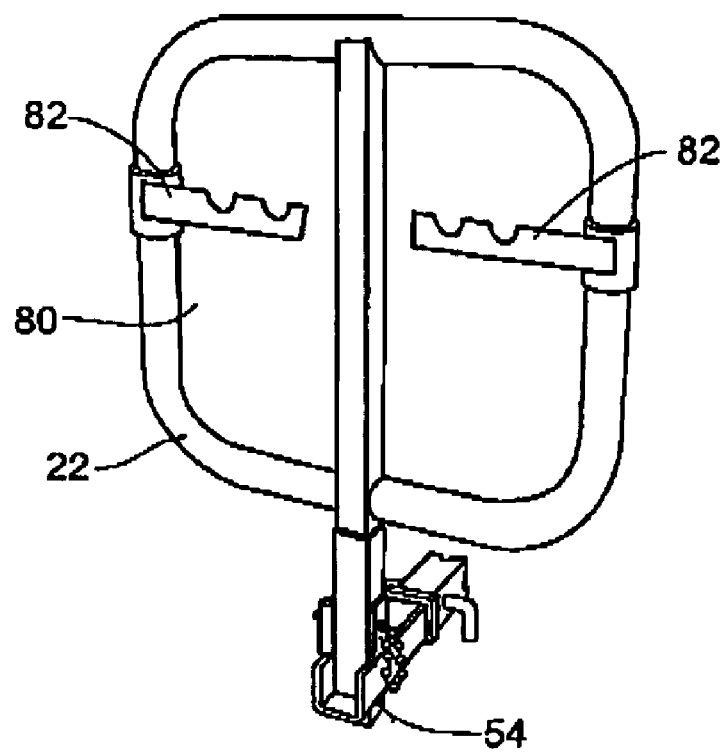
FIG. 6 is a perspective view of an alternative embodiment of the vehicle mounted step assembly with a bicycle rack attached thereto.

In another embodiment of the present invention, the vehicle mounted step assembly 10 includes a bicycle rack 80 attached to a lower surface of the platform portion 12, as illustrated in FIG. 6. The bicycle rack 80 preferably includes two sections 82 that are mounted to the frame 22 to pivot between a storage position and a use position.

Figure 7:
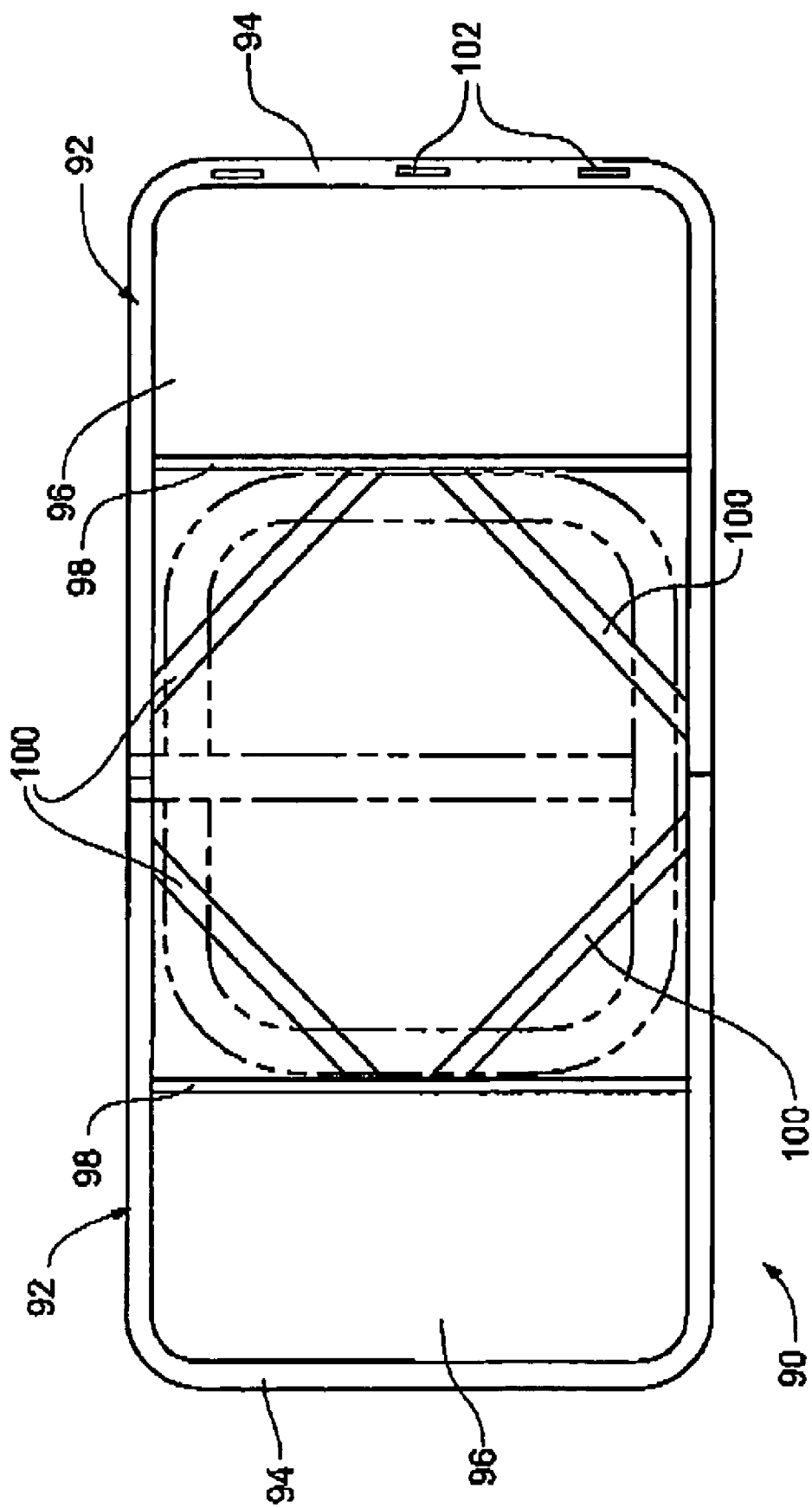
FIG. 7 is a top view of a cargo carrier attached to the vehicle mounted step assembly.
Figure 8:
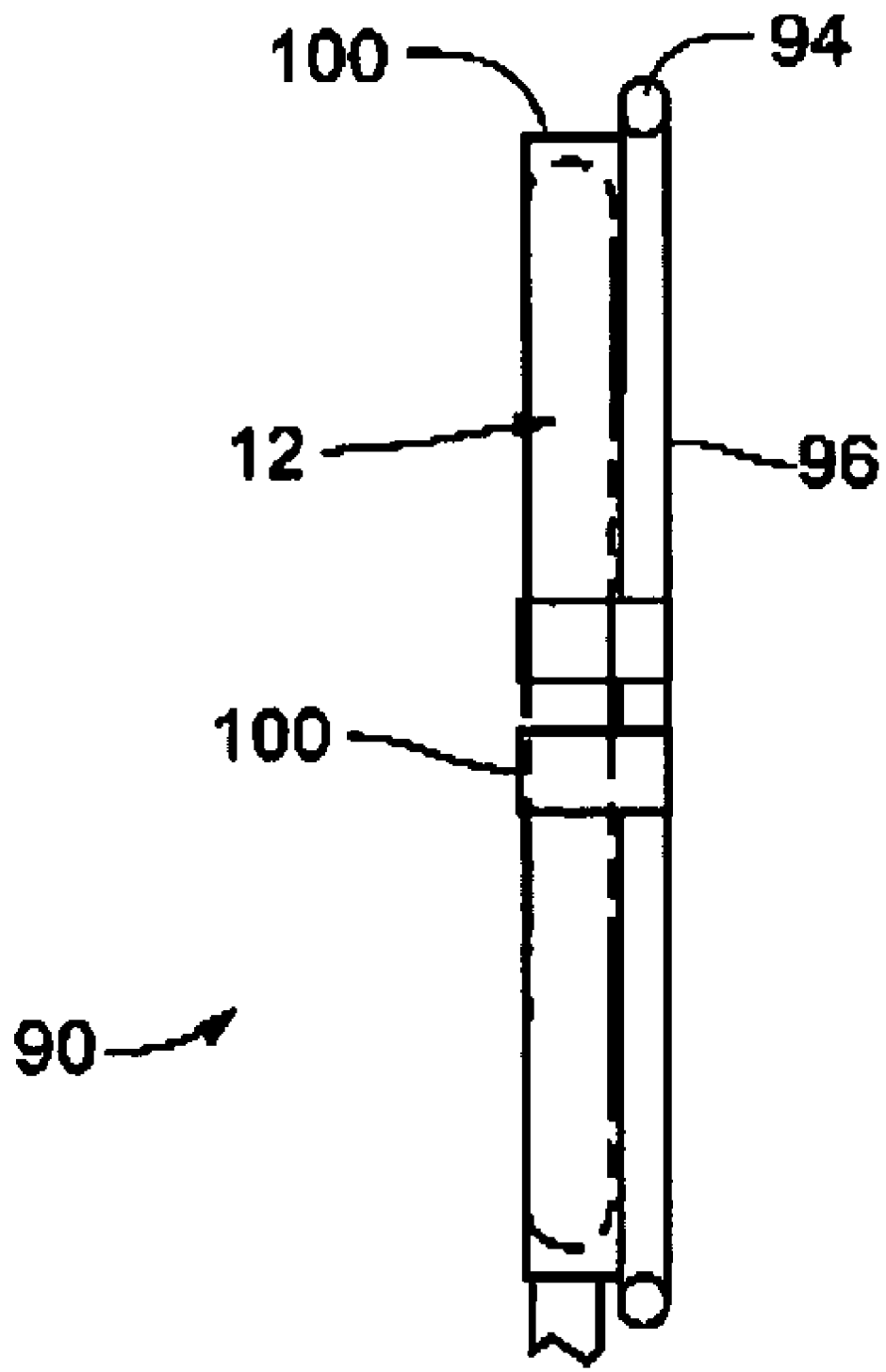
FIG. 8 is a side view of the cargo carrier attached to the vehicle mounted step assembly.

In yet another embodiment of the present invention, a cargo carrier 90 is attached to the vehicle mounted step assembly 10, as illustrated in FIGS. 7 and 8. The cargo carrier 90 provides an upper surface that is preferably at least twice as large as the surface area provided by the top plate 20. The cargo carrier 90 preferably has a length of between about 48 inches and 60 inches and a width of about 24 inches.

The cargo carrier 90 is preferably fabricated in two sections 92 that are substantially mirror images of each other. The cargo carrier 90 generally includes a frame 94 and a top plate 96. The frame 94 preferably extends around an outer edge of the top plate 96. The width of the frame 94 is selected to be slightly larger than a width of the top plate 96 to prevent the cargo carrier 90 from moving forward and backward with respect to the vehicle mounted step assembly 10.

A cross bar 98 extends across frame 94. The cross bar 98 thereby prevents lateral movement of the cargo carrier 90 with respect to the vehicle mounted step assembly 10.

The cargo carrier 90 also preferably includes two angle pieces 100 mounted to a lower surface to extend between the frame 94 and the cross bar 98. The angle pieces 100 prevent vertical movement of the cargo carrier 90 with respect to the vehicle mounted step assembly 10.

The cargo carrier 90 may include slots or apertures 102 to facilitate mounting side or back rails (not shown) to the cargo carrier 90.

The two sections 92 are preferably mounted together by extending a pin (not shown) through a lower surface thereof. The pin facilitates readily attaching and detaching the cargo carrier 90 to the vehicle mounted step assembly 10.

In operation, the main shaft 30 is moved with respect to the central member 24 to either the first configuration for sport utility vehicles or the second configuration for pickups and then fastened using the screws 34 and nuts 36.

The vehicle mounted step assembly 10 is attached to a vehicle by means of a receiver hitch 104. The second end 42 of the pivot mount 32 is extended into the receiver hitch 104 and ten locked into place using a receiver hitch pin 106.

Figure 9:
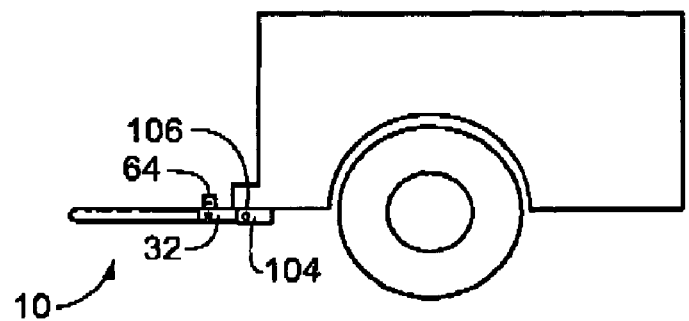
FIG. 9 is a side view of the vehicle mounted step assembly attached to the vehicle in the first configuration and in the lowered position.

The first configuration, which is illustrated in FIG. 9, thereby positions the platform portion 12 sufficiently close to a vehicle bed of the sport utility vehicle so that the vehicle mounted step assembly 10 can provide an intermediate height between the vehicle bed and the ground surface to facilitate moving objects into and out of the vehicle bed.

Figure 10:
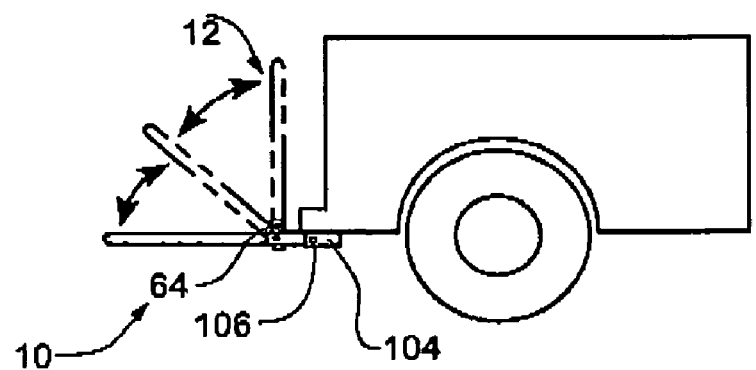
FIG. 10 is a side view of the vehicle mounted step assembly attached to the vehicle in the second configuration showing movement between the lowered position and the raised position.

Once the vehicle mounted step assembly 10 is attached to the vehicle, it may be moved from the raised position to the lowered position by removing the clip 64 and then urging the platform portion 12 to a substantially horizontal orientation, as illustrated in FIG. 10. The weight of the platform portion 12 is typically sufficient to maintain the platform portion 12 in the lowered position.

Figure 11:
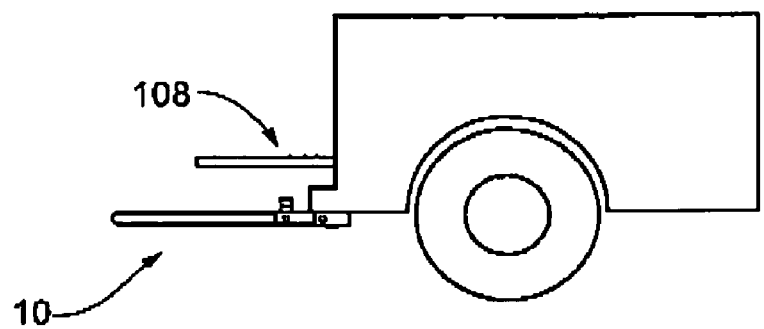
FIG. 11 is a side view of the vehicle mounted step assembly attached to a vehicle in the second configuration and in the lowered position.

FIGS. 10 and 11 also illustrate the vehicle mounted step assembly 10 in the second configuration that is particularly suited for use with pick-ups that have a tailgate 108, which pivots to a lowered position to facilitate access to the vehicle bed. By using the vehicle mounted step assembly 10 in the second configuration, the platform portion 12 is moved away from the tongue portion 14 so that a significant portion of the platform portion 12 is not underneath the tailgate 108.

It is contemplated that features disclosed in this application, as well as those described in the above applications incorporated by reference, can be mixed and matched to suit particular circumstances. Various other modifications and changes will be apparent to those of ordinary skill.

What is claimed is:

1. A convertible vehicle step assembly for use with trailer hitch, the convertible vehicle step comprising:
    a platform having a top plate and central member attached thereto;
    a main shaft that is slidable with respect to the central member between a first configuration and a second configuration;
    a pivot mount having a first end and a second end, wherein the first end is adapted for attachment to a trailer hitch having a square recess, wherein the second end has a pivot aperture extending therethrough, wherein the first end is pivotally mounted to an end of the main shaft that is opposite the central member, and wherein the main shaft is pivotable with respect to the pivot mount between a lowered position and a raised position; and
    a pivot arm locking bracket attached to the pivot mount proximate the second end, wherein the pivot arm at least partially extends around the main shaft when the main shaft is in the raised position.

2. The vehicle mounted step assembly of claim 1, wherein the platform comprises a frame attached to the top plate.

3. The vehicle mounted step assembly of claim 1, and further comprising a pin that extends through the pivot arm locking bracket and the main shaft to retain the main shall in the raised position.

4. The vehicle mounted step assembly of claim 1, and further comprising a bicycle mount attached to the platform.

5. The vehicle mounted step assembly of claim 4, wherein the bicycle mount is movable between an extended position and a retracted position, wherein the bicycle mount is substantially flat against the platform when in the refracted position.

6. The vehicle mounted step assembly of claim 1, and further comprising a cargo carrier attached to the platform.

7. The vehicle mounted step assembly of claim 6, wherein the cargo carrier includes a first section and a second section that are substantially mirror images of each other, and wherein the first section and the second section each slide over a portion of the platform.

8. The vehicle mounted step assembly of claim 7, wherein the first section and the second section each include a frame, a top plate, a cross member and an angle piece, wherein the frame extends around at least a portion of the top plate, wherein the cross member is attached to the frame to prevent the cargo carrier from moving laterally with respect to the platform, and wherein the angle piece extends between the frame and the cross member to prevent the cargo carrier from moving vertically with respect to the platform.

9. The vehicle mounted step assembly of claim 1, wherein the main shaft is slidable with respect to the central member between a shortened sport utility version and a lengthened pick-up version.

10. The vehicle mounted step assembly of claim 1, and further comprising a biasing means for urging the main shaft to the raised position.

11. The vehicle mounted step assembly of claim 1, wherein the pivot mount has an inner lower support and an outer upper support, wherein the inner upper support is between the first end and the pivot point, and wherein the outer lower support is between the second end and a pivot point.

12. A method of attaching a vehicle mounted step assembly to a receiver hitch, the method comprising:
  providing a platform portion having a top plate and a central member attached thereto;
  attaching a main shaft at a first position on the central member; pivotally attaching a pivot mount proximate an end of the main shaft that is opposite the central member;
  attaching a pivot arm mounting bracket to the pivot mount;
  maintaining the main shaft in a raised position by extending a clip through the pivot arm mounting bracket and the main shaft;
  engaging an end of the pivot mount that is opposite the main shaft with a receiver hitch on a vehicle; and
  sliding the main shaft with respect to the central member from the first position to a second position.

13. The method of claim 12, wherein the main shaft is pivoted vertically with respect to the pivot mount.

14. The method of claim 12, wherein the main shaft is pivotable about a pivot axis, when the main shaft is pivoted about the pivot axis to a lowered position, the main shalt contacts an upper portion of the pivot mount and a lower portion of the pivot mount and wherein the upper portion and the lower portion are located on opposite sides of the pivot axis.

15. The method of claim 12, and further comprising forming the top plate with a surface area of at least 300 square inches.

16. The method of claim 12, and further comprising applying an anti-slip coating to the top plate.

17. The method of claim 12, and further comprising attaching a frame to the top plate and the central member.

18. The method of claim 12, and further comprising biasing the main shaft to the raised position.

19. The method of claim 12, and further comprising attaching a bicycle rack to the platform portion.

20. The method of claim 12, and further comprising attaching a cargo carrier to the platform.

21. The method of claim 20, wherein the cargo carrier includes a first section and a second section that are substantially mirror images of each other, and wherein the method further comprising sliding the first section and the second section each over a portion of the platform.

22. The method of claim 21, wherein the first section and the second section each include a frame, a top plate, a cross member and an angle piece, wherein the frame extends around at least a portion of the top plate, wherein the cross member is attached to the frame to prevent the cargo carrier from moving laterally with respect to the platform, and wherein the angle piece extends between the frame and the cross member to prevent the cargo carrier from moving vertically with respect to the platform.

* * * * *

UNITED STATES PATENT AND TRADEMARK OFFICE
CERTIFICATE OF CORRECTION

PATENT NO. : 7,114,736 B2  
APPLICATION NO. : 10/776039  
DATED : October 3, 2006  
INVENTOR(S) : Craig S. Stodola et al.

It is certified that error appears in the above-identified patent and that said Letters Patent is hereby corrected as shown below:

Column 5, Line 46:

Delete "ten" and insert --then--.

Column 6, Line 30:

Delete "shall" and insert --shaft--.

Column 7, Line 6:

After "member;" begin a new paragraph.

Column 7, Line 22:

Delete "shalt" and insert --shaft--.

Signed and Sealed this

Twenty-sixth Day of June, 2007

JON W. DUDAS  
*Director of the United States Patent and Trademark Office*